United States Patent
Mason et al.

(10) Patent No.: US 10,191,536 B2
(45) Date of Patent: Jan. 29, 2019

(54) METHOD OF OPERATING A CONTROL SYSTEM AND CONTROL SYSTEM THEREFORE

(71) Applicant: KONINKLIJKE PHILIPS N.V., Eindhoven (NL)

(72) Inventors: Jonathan David Mason, Waalre (NL); Dzmitry Viktorovich Aliakseyeu, Eindhoven (NL); Sanae Chraibi, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/115,434

(22) PCT Filed: Jan. 26, 2015

(86) PCT No.: PCT/EP2015/051463
§ 371 (c)(1),
(2) Date: Jul. 29, 2016

(87) PCT Pub. No.: WO2015/117852
PCT Pub. Date: Aug. 13, 2015

(65) Prior Publication Data
US 2017/0177073 A1     Jun. 22, 2017

(30) Foreign Application Priority Data

Feb. 7, 2014    (EP) .................................... 14154248

(51) Int. Cl.
*G09G 5/00*      (2006.01)
*G06F 3/01*      (2006.01)
*G08C 17/00*      (2006.01)

(52) U.S. Cl.
CPC .............. *G06F 3/011* (2013.01); *G06F 3/017* (2013.01); *G08C 17/00* (2013.01); *G08C 2201/32* (2013.01)

(58) Field of Classification Search
CPC ......... G06F 3/011; G06F 3/017; G08C 17/00; G08C 2201/32
(Continued)

(56) References Cited

U.S. PATENT DOCUMENTS

2009/0027337 A1*   1/2009   Hildreth .................. G06F 3/011
                                                        345/158
2010/0046796 A1    2/2010   Pietquin
(Continued)

FOREIGN PATENT DOCUMENTS

CN          102982557 A      3/2013

OTHER PUBLICATIONS

Sinha et al, "Person Identification Using Skeleton Information From Kinect", ACHI: The Sixth International Conference on Advances in Computer-Human Interactions, 2013, pp. 101-108.
(Continued)

*Primary Examiner* — Insa Sadio (57) ABSTRACT

A method of operating a control system for controlling a device, the control system comprising a motion capture equipment, and a controller for providing control signals for controlling one or more device functions of the device, the method comprising the steps of: capturing, by the motion capture equipment, motion picture images of a space and providing the motion picture images to the controller; analyzing, by the controller, the motion picture images for detecting user input from a user in the space, and detecting by the controller a gesture performed by the user; and providing, by the controller in response to said detecting of the gesture, a control signal to the device for controlling a
(Continued)

selected device functions of said one or more device functions; wherein said analyzing is performed by the controller by monitoring one or more gesture zones in said motion picture images, each gesture zone being associated with one respective device function of said plurality of device functions, and wherein for providing said control signal the controller determines the gesture zone wherein the gesture is detected for establishing the selected device function to control.

14 Claims, 6 Drawing Sheets

(58) Field of Classification Search
USPC .......................................................... 345/158
See application file for complete search history.

(56) References Cited

U.S. PATENT DOCUMENTS

| | | |
|---|---|---|
| 2011/0093820 A1 | 4/2011 | Zhang et al. |
| 2011/0193939 A1 | 8/2011 | Vassigh et al. |
| 2011/0296353 A1 | 12/2011 | Ahmed et al. |
| 2013/0009861 A1 | 1/2013 | Valik et al. |
| 2013/0044912 A1* | 2/2013 | Kulkarni ............ G06K 9/00671 382/103 |
| 2013/0261871 A1 | 10/2013 | Hobbs et al. |

OTHER PUBLICATIONS

Independent, "Sony's PS4 Will Support Voice Commands and Facial Recognition", http://www.independent.co.uk/life-style/gadgets-and-tech/news/sonys-ps4-will-support-voice-commands-and-facial-recognition-8794738.html, Sep. 2, 2013, 4 Pages.

VG247, "Xbox One: Microsoft Details Controller Recognition, Real-Time Facial Expressions", http://www.vg247.com/2013/07/20/xbox-one-microsoft-details-controller-recognition-real-time-facial-expressions, Jul. 20, 2013, 2 Pages.

User Guide for Dual Depth Sensor Configuration (Printable Version), http://wiki.ipisoft.com/user_guide_for_dual_depth_sensor_configuration_(printable_version), Sep. 7, 2013, 28 Pages.

* cited by examiner

METHOD OF OPERATING A CONTROL SYSTEM AND CONTROL SYSTEM THEREFORE

CROSS-REFERENCE TO PRIOR APPLICATIONS

This application is the U.S. National Phase application under 35 U.S.C. § 371 of International Application No. PCT/EP2015/051463, filed on Jan. 26, 2015, which claims the benefit of European Patent Application No. 14154248.0, filed on Feb. 7, 2014. These applications are hereby incorporated by reference herein.

TECHNICAL FIELD

The present invention relates generally to a method of operating a control system for controlling a device, the control system comprising a motion capture equipment, and a controller for providing control signals for controlling one or more device functions of the device, the method comprising the steps of: capturing, by the motion capture equipment, motion picture images of a space and providing the motion picture images to the controller; analyzing, by the controller, the motion picture images for detecting user input from a user in the space, and detecting by the controller a gesture performed by the user; and providing, by the controller in response to said detecting of the gesture, a control signal to the device for controlling a selected device function of said one or more device functions. The invention further relates to a control system for performing such a method, and to a computer program product.

BACKGROUND

Methods and systems for operating devices by means of gestures are available in different variants and fields of application. Early implementations of such systems simply relied on the detection of motion by a motion sensor to operate devices. However, the technology has evolved and currently allows to detect specific motion patterns, to enable a user to target operation of a device by specific gestures or to make operation of the device less sensible to just any kind of motion in front of the sensor.

To enable such functionality, image analysis algorithms may be applied to perform gesture recognition. Such image pattern recognition methods aim to become more and more accurate and reliable to increase the functionality. With this, gesture recognition not only becomes more accurate. It also becomes more complex, requires more arithmetic capability of the control system, the system thereby consuming more energy in idle state, or alternatively requiring a trade-off with respect to functionality.

At the same time, more and more systems become available that demand or require different manners of control than conventional switches. In modern households, various devices become controllable through the use of smart phones. However, since a smart phone may not always be at hand, also the use of gesture based control has made an entrance in this field. For example, such devices may include gesture controllable lights, televisions, computers or the like. With the increasing number of devices that may rely on gesture based control, the abovementioned increase of complexity of gesture based control systems and methods becomes a fact.

As an example of a sophisticated gesture recognition system, U.S. patent application No. US 2011/0193939 relates to a motion capture system having a depth camera, wherein a physical interaction zone of a user is defined based on a size of the user and other factors. The interaction zone can be anchored to the user and may be suitably shaped having its own coordinate system to allow mapping of a motion into a corresponding action. The system tracks the movement of the user's hand (or other body part) translating it to a corresponding action on the display.

US applications numbers US 2011/296353, US2009/027337 and US2013/009861 relate to other control systems applying gesture based user input.

SUMMARY OF THE INVENTION

It is an object of the present invention to provide an equipment control method that provides an advanced level of sophistication and user comfort at an acceptable level of complexity.

The invention achieves these and other objects in that it provides for a method of operating a control system for controlling a device. The control system operated by the method comprises a motion capture equipment, and a controller for providing control signals for controlling one or more device functions of the device. The method comprises steps of capturing, by the motion capture equipment, motion picture images of a space and providing the motion picture images to the controller. The method also comprises analyzing, by the controller, the motion picture images for detecting user input from a user in the space, and detecting by the controller a gesture performed by the user. In response to said detecting of the gesture, the control system in accordance with the method provides a control signal to the device for controlling selected device functions of said one or more device functions. In particular, in accordance with the invention, the abovementioned step of analyzing of the motion picture images is performed by the controller by monitoring one or more gesture zones in said motion picture images, wherein each gesture zone being associated with one respective device function of said one or more device functions. For said providing of the control signal to the device, the controller determines the gesture zone wherein the gesture is detected for establishing the selected device function to control.

The invention is based on the insight that complex gesture recognition systems for recognizing accurately the exact movement that a hand (or other body part) makes, such as to discriminate a specific command or instruction by the user, is not required in order to allow a large variety of device functions to be controlled with simple gestures. In the invention, gestures are distinguished from each other by defining gesture zones to be monitored by the control system, and assigning each gesture zone to a specific device function. The control system then merely has to detect activity of a body part in the defined gesture zone to enable the control system to directly distinguish the device function to be controlled.

As will be appreciated, the control system may preferably discriminate the body part that performs the motion in the gesture zone, such as to prevent accidental activation or deactivation of any device functions by accidental movements of a user in a specific gesture zone. Moreover, the gesture zones may be anchoraged to specific objects in the space monitored, such as chairs or tables, and even to persons. This anchoring to an object or person may be implemented by defining the gesture zone as being relatively located in a fixed position with respect to the object or person to which it is linked.

The control system may monitor a plurality of gesture zones at the same time, and perform corresponding action as soon as motion is detected in one or more of these gesture zones. Instead of being anchored to an object or person, the gesture zones may also be anchored to a specific spatial feature of the surroundings that define the space. For example, the control system may monitor a gesture zone which is located in the middle of the room, or right in front of the entrance to a room or at a fixed position relative to a window. If a gesture zone is anchored to an object, the gesture zone could for example be located above a table, at the side of a couch or seat, in an area underneath a lamp, or any other suitable location relative to an object in the space. Where a gesture zone is anchored to a person, it could for example be located to the left or right of a user's head above his/her shoulder, in front of the person's belly, at the left or right side of a person's leg (e.g. near his knees), or any other suitable location that may be reached conveniently by the user.

Throughout the application, the word 'entity' has been used to indicate the entity, i.e. object, spatial feature or person (user or other person), to which a gesture zone is anchored. As will be appreciated, multiple gesture zones may be anchored to a same entity or to different entities dependent on the situation or preferences set by a user. Alternatively or, in addition, multiple gesture zones may be anchored to a single entity.

The different gesture zones must be distinguishable by the control system to allow the control system to associate the detected gesture with the correct device function to be controlled. Overlapping gesture zones may thus be counterproductive, however adjacent contiguous gesture zones having a common border could be distinguished e.g. in 2D or 3D.

The control system itself could be equipped with depth tracking functionality such as to allow to distinguish different gesture zones that are relative to the motion capture equipment (e.g. camera) aligned with each other and the motion capture equipment, as long as these gesture zones are located at different (non overlapping) distances relative to the motion capture equipment. Such depth tracking functionality may be implemented for example by means of the motion capture equipment consisting of multiple cameras that monitor the space from different positions, such as to capture 3D information of the space. Alternatively, the motion capture equipment may consist of a single camera wherein the control system is arranged for distinguishing depth by means of image analysis algorithms.

For example, depth may be distinguished using a single camera by monitoring the size of a person or object as it moves through the space. If the motion capture equipment monitors the user, it is able to distinguish whether the user performs a gesture close to the camera or at a distance further therefrom, simply by monitoring the size of the user becoming larger and smaller while moving. By tracking skeleton information from the user (e.g. the position of feet, knees, hip, shoulders, elbows, hands, and head) it is possible for the control system to identify whether the person is standing or sitting or lying in front of the motion capture equipment. Any of the above information can be used to further distinguish specific input by the user, without having to rely on complicated motion or image analysis algorithms.

To allow the control system to monitor gesture zones, gesture zone definitions data of the gesture zones may be obtained by the controller of the control system by accessing a data repository such as a memory or similar, or by receiving gesture zone definition data through a wireless or wireline network, e.g. from a remote server. This gesture zone definition data may be based on input received from user preferences that have been provided by a user or operator at any time earlier to a control system.

In addition to the above, in accordance with a further embodiment, the controller may perform pattern recognition analysis to provide auxiliary information from the motion picture images, for recognizing the user or a further person from the motion picture images. For example the controller may be programmed to perform face recognition to allow the control system to distinguish input from different persons. Instead of performing face recognition, this information may also be obtained by recognizing other features of the body of the user or further person distinguishable from the image.

However, if the control system and method are suitable for also recognizing the user or the further person, the controller may further, in accordance with the embodiment, access a gesture zone profile associated with the recognized user, wherein the gesture zone profile contains gesture zone definition data customized for the recognized user, and wherein the gesture zone profile is used by the controller for performing the analysis of the motion picture images for detecting user input by the recognized user. In other words, a first user could have defined preferential gesture zones for controlling one or more devices, wherein these gesture zones are located and linked to entities considered suitable by that user. For example a child may have a gesture zone for controlling the light in a room linked to an object which is closer to the ground than an adult person. This allows the child to easily control the light.

In even a further embodiment, the location, the shape, or the presence or absence of one or more of the gesture zones monitored by the controller may be dependent on the presence or absence of one or more users and/or further persons recognized by the controller, the controller using different gesture zone definition data dependent on said recognition. For example the controller may recognize the presence of unknown persons with the user, and based thereon determine that the user has a visitor. In response, the control system may adapt the lighting conditions or switch on the audio system to play music.

In accordance with a further embodiment, the method comprises a step of determining a distance between two users and/or further persons, wherein at least one of the location, the shape, the presence, or absence of one or more of the gesture zones that are monitored by the controller is dependent on the distance. For example, some gesture zones may only appear if two persons are standing close to each other, or the gesture zone between two persons may be adapted in size dependent on the relative positions of the two persons with respect to each other.

According to a further embodiment of the present invention, the method comprises a step of the controller performing a pattern recognition analysis on one or more of the motion picture images for recognizing an ongoing activity in the space. In this embodiment, at least one of the location, the shape, the presence or absence of one or more of the gesture zones monitored by the controller is dependent on the recognition of the activity, wherein the controller uses different gesture zone definition data dependent on said recognition of the activity. For example the control system and controller may recognize that the persons visible on the motion picture images are sitting around the table, and may adapt the location and size of the gesture zones dependent thereon. If for example a gesture zone for controlling the light is by default located near the entrance to a chamber, the control system may adapt the location of this gesture zone to an area above a table in case the control system detects that the users or other persons are sitting around that table.

According to a second aspect, the invention relates to a computer program product downloadable from a communication network and/or stored on a computer-readable and/or microprocessor-executable medium, the product comprising program code instructions for implementing a method in accordance with the first aspect of the invention. Moreover, the invention relates to a data carrier comprising such a computer program product.

According to a third aspect, the invention relates to a control system for controlling a device, the control system comprising a motion capture equipment, and a controller for providing control signals for controlling one or more device functions of the device, wherein the motion capture equipment is arranged for capturing motion picture images of a space and providing the motion picture images to the controller, wherein the controller is arranged for analyzing the motion picture images for detecting user input from a user in the space, and for detecting a gesture performed by the user; and wherein the controller is further arranged for providing, in response to said detecting of the gesture, a control signal to the device for controlling a selected device functions of said one or more device functions; wherein for performing said analyzing the controller is arranged for monitoring one or more gesture zones in said motion picture images, each gesture zone being associated with one respective device function of said one or more device functions, and wherein for providing said control signal the controller is arranged for determining the gesture zone wherein the gesture is detected for establishing the selected device function to control.

BRIEF DESCRIPTION OF THE DRAWINGS

Herein below, the invention will be described by some specific embodiments thereof, with reference to the enclosed drawings, wherein.

DETAILED DESCRIPTION

In the present description, the term motion picture images has been used to indicate images taken by a motion capture device. The term motion picture is to be understood to mean a series consecutively recorded of images from which any motion taking place in the scene recorded on the image can be identified. In many embodiments of the invention, the motion capture equipment will be video capture equipment and the motion picture images will be video images, such as one or more camera's recording a scene (i.e. a room or other monitored space). In other embodiments, the motion capture equipment may comprise heat sensitive motion recording means such as heat sensors or heat camera's, or even other type of sensors that enable to register images from which motion may be registered. In the present detailed description, reference will be made to video images and video capture equipment. However, it is to be understood that the invention is not limited to regular video capture equipment, but could include different motion capture equipment, such as indicated hereinabove. For this reason, reference is made to the claims which use the term 'motion capture equipment' as including also video capture equipment, and the term 'motion picture images' as including also video images.

Figure 1:
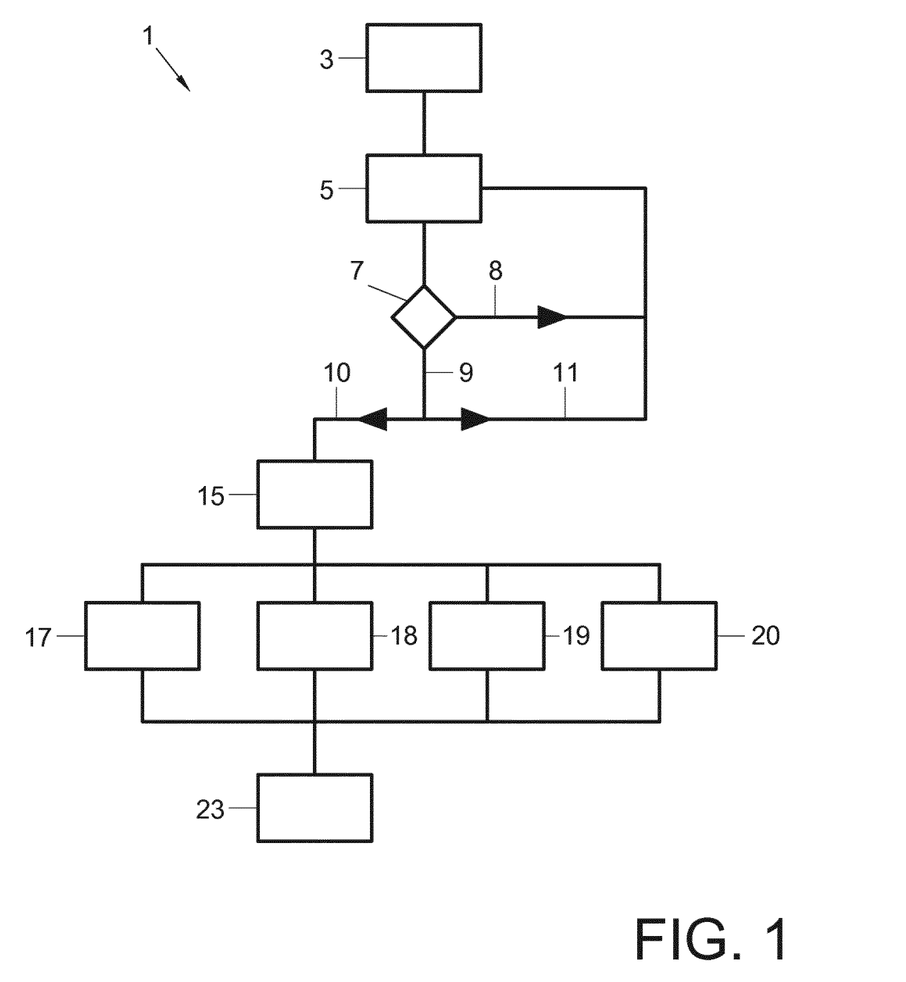
FIG. 1 schematically illustrates a method in accordance with an embodiment of the present invention.
Figure 2A:
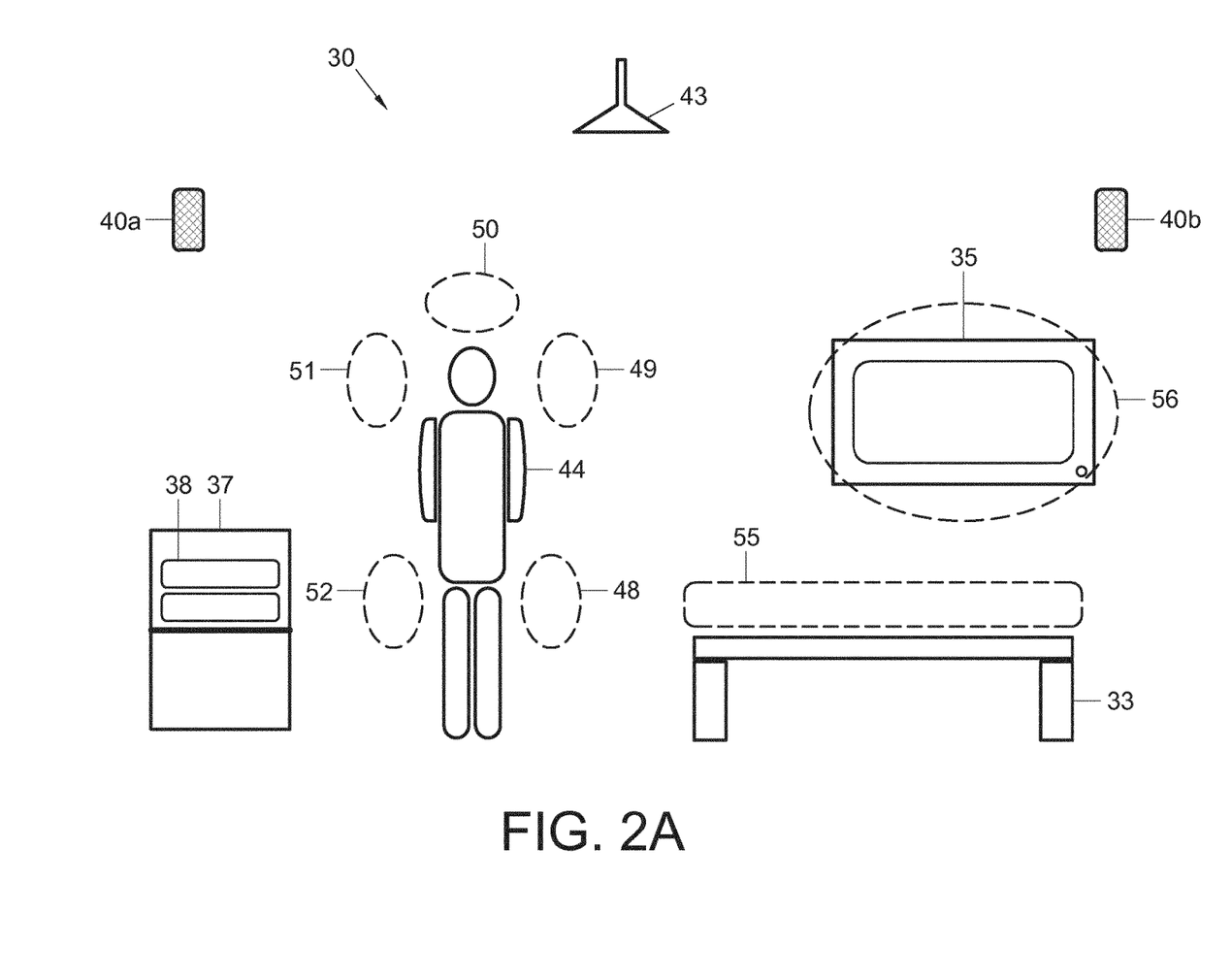
FIGS. 2a and 2b schematically illustrate a video image captured by motion capture equipment of a control system of the present invention.
Figure 2B:
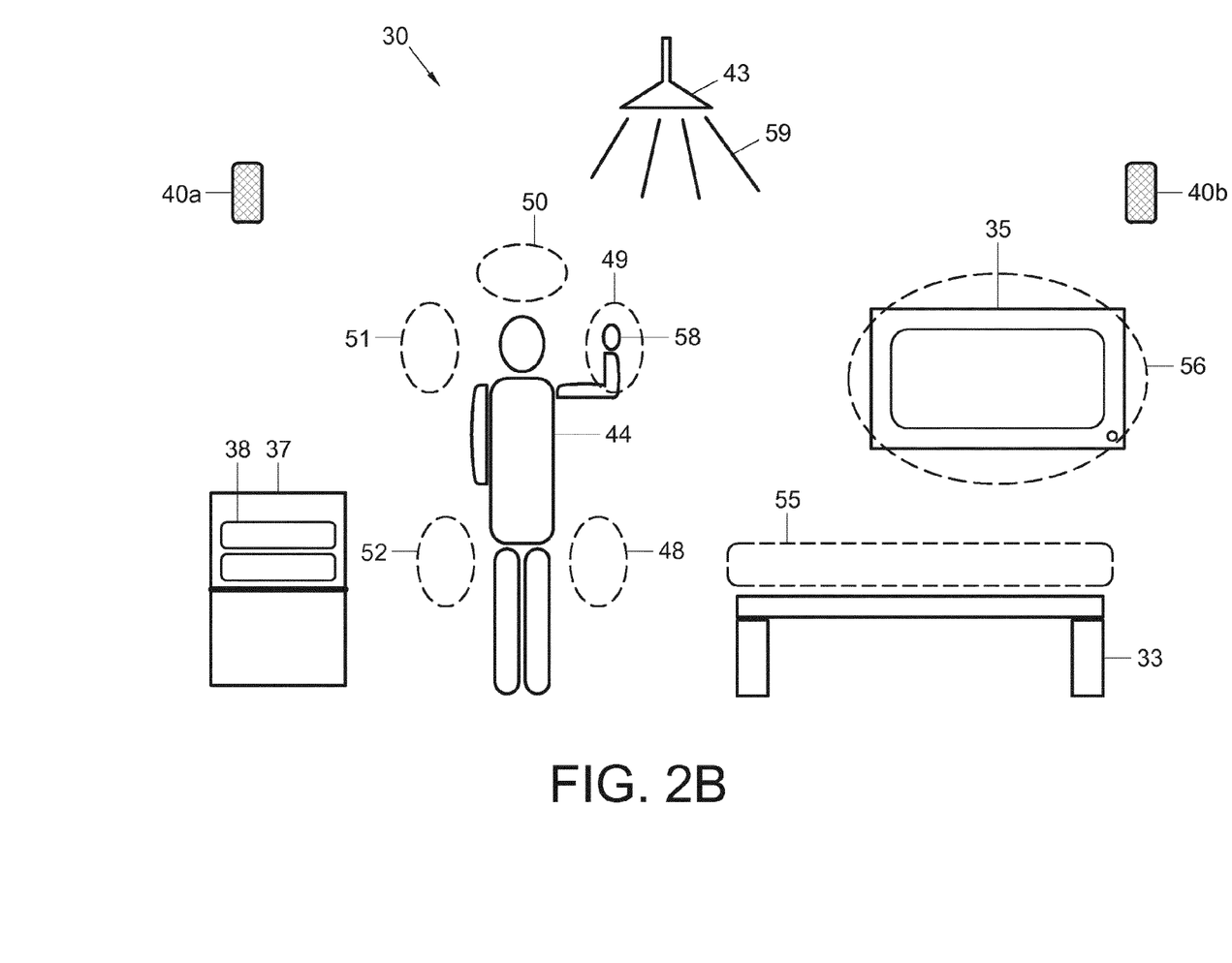
Figure 3:
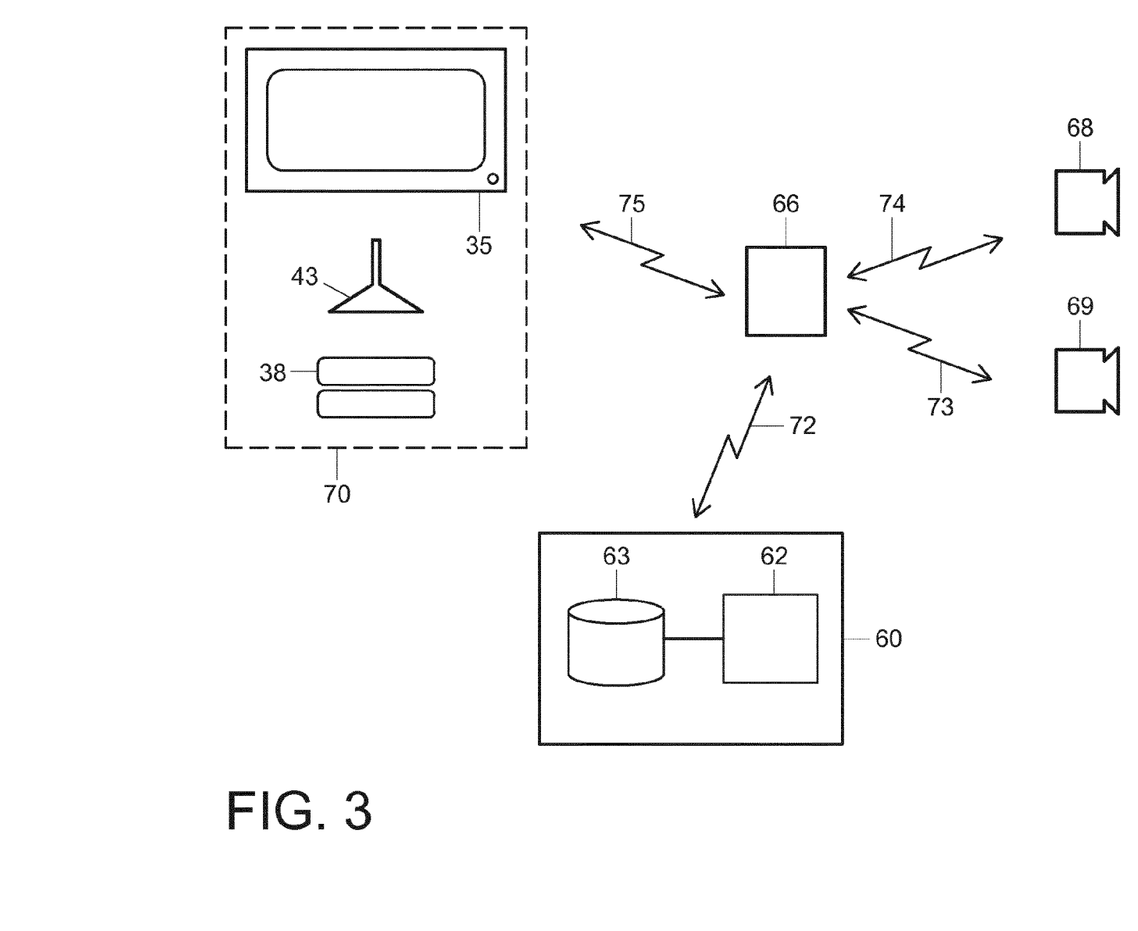
FIG. 3 schematically illustrates a control system of the present invention used in the situation illustrated in FIGS. 2a and 2b.

FIGS. 1, 2a, 2b and 3 illustrate schematically a method, captured video images, and a control system of the present invention as used in a typical situation wherein the invention may be applied. As illustrated in FIG. 3, the control system 60 comprises at least controller 62, and optionally a memory 63. Although the use of a data repository in the form of a memory in the control system will be preferential, the control system 60 may additionally or alternatively make use of an external memory, e.g. reachable through a data network, or of any other input device or server from which alternatively definition data may be retrieved.

The control system 60 communicates using wireless signals 72 with a wireless router 66 of a wireless network. Alternatively, a control system 60 may be connected to a wire line network (not shown) or by means direct cables to the video capture equipment formed by camera devices 68 and 69 of a control system 60. In the embodiment illustrated in FIG. 3, video capture equipment camera devices 68 and 69 communicate with wireless signals 73 and 74 also with the wireless router 66, such as to exchange video images through the wireless data connection with the controller 62. In the embodiment of FIG. 3, the video capture equipment 68 and 69 consist of two camera devices for capturing video images of a living room 30 as shown as FIGS. 2a and 2b. Alternatively, a different number of camera devices may be applied for capturing the video images. For example the control system 60 may also be based on a single camera device that captures the video images. Moreover, although in the embodiment of FIG. 3 use is made of camera devices, alternative suitable types of sensors that are able to record, locate and/or motion maybe applied for capturing the video images. In the system of FIG. 3, the two cameras 68 and 69 are applied for obtaining depth information from the video images.

FIG. 2a illustrates a video image captured by one of the cameras 68 or 69 from a living room 30, wherein a user 44 is present. In the living room 30 a plurality of devices that may be controlled through the control system are installed. For example, the living room comprises a lamp 43, a television set 35, and an audio system 38 which are connected to speakers 40a and 40b. Also present in the living room 36 is a table 33, and a cabinet 37 wherein the audio system 38 is placed.

FIG. 1 schematically illustrates a method 1 of the present invention. The method of the present invention will be explained below with reference to FIGS. 2a and 2b and FIG. 3. In the method of the present invention, the video capture equipment consisting of camera devices 68 and 69 captures video images in step 3, and provides them via the wireless router 66 and through wireless signals 72-74 to the controller 62 of the control system 60. A typical image captured by one of the cameras is illustrated in FIG. 2a and has been briefly explained above. The controller 62 permanently monitors a plurality of gesture zones 48-52, 55 and 56 in each of the video images received. This monitoring is performed by analyzing the video images captured by video capture equipment camera devices 68 and 69 in step 5 of the method. The gesture zones are indicated in FIG. 2a. A plurality of gesture zones 48, 49, 50, 51 and 52 have been defined being anchored to the user 44. By anchoring the gesture zones, each of the gesture zones 48-52 is located in a fixed relative position to the user 44. Gesture zones 48 and 52 are located on the left and right side of the user 44, near his upper legs. Gesture zones 49 and 51 are located on the left and right side of the head of the user 44. And gesture zone 50 is located above the head of the user 44. Each of the gesture zones 48-52 that is anchored to the user 44 is located in an convenient location for the user to reach, such as to enable the user to easily control device functions of the various devices 35, 38, and 43 in the living room 30. Further gesture zones are defined in different locations, such as gesture zone 56 in front of television 35, and gesture cone 55 above table 33. Gesture zone definition data used by the controller 62 for monitoring each of the gesture zones 48-52, 55 and 56, may be retrieved by the controller 62 from the memory 63. This gesture zone definition data may be based on input received from the user 44 (or any other operator) while installing the system and indicating preferences, or may be pre-stored.

In step 7 of the method 1, during analyzing, the control system decides whether or not user input is received by the recognition of the gesture ongoing in any of the gesture zones 48-52, 55 and 56. If no user input or gestures have been detected, following branch 8, the monitoring and analysis in step 5 and 7 continue. If a gesture is detected in step 7, the method forwards branch 9. Branch 9 splits into branches 10 and 11: branch 11 ensures that the monitoring of the gesture zones continues while the received gesture is handled. Branch 10 is associated with the handling of the received gesture.

For handling the received gesture in step 15 the controller 62 determines the exact gesture zone wherein the gesture has been detected. Each of the gesture zones 48-52, 55 and 56 is associated with one device function of the devices 35, 38, and 43 to be controlled by the control system 60. It may be appreciated, a single device function may be associated with multiple gesture zones, such that detecting a gesture in any of these associated gesture zones triggers controlling of the device function. However, a device function may also be associated with a single gesture zone. As will be appreciated associating multiple device functions with a single gesture zone is counterproductive, since in that case further analysis is required to determine whether a gesture received in one gesture zone is intended to control a first or a second device function that would be associated with that gesture zone. In the most basic embodiment of the present invention, wherein no further analysis is being performed to retrieve any further information regarding the received gesture, gesture zone is only associated with one device function, although multiple gesture zones may be associated with a single device function.

FIG. 2b illustrates the user 44 raising his hand 58 into gesture zone 49. The control system 60 simply detects that a hand 58 is raised into gesture zone 49. No further analysis of any motion performed by the hand 58 is required to simply detect that the user 44 intents to control the device function that is associated with gesture zone 49. Gesture zone 49 is associated with the switching on and off of the lamp 43. Therefor, by raising the hand 58 into gesture zone 49, the lamp 43 is turned on which is schematically indicated by the raise 59 in FIG. 2b.

In the method of FIG. 1, in step 7 it is detected that one of the gesture zones 48-52, 55 or 56 has received user input. Then, following branch 10, handling of the user input commences in step 15 while the system maintains monitoring and analyzing in steps 5 and 7. In step 15 the control system 60 determines that hand 58 is raised in gesture zone 49, and from memory 63 the controller retrieves data that gesture zone 49 is associated with the switching on and off of lamp 43. In step 23 of method 1, a corresponding control signal for switching the lamp 43 on is send by a wireless signals 72 and 75 to the lamp 43. It is important to note that steps 17, 18, 19 and 20, which will be explained further below, are optional steps to the method 1. In FIG. 1 these steps 17, 18, 19, 20 have been illustrated for explanatory purposes, however, the method 1 of FIG. 1 in a different embodiment could skip the steps 17-20 and go from step 15 directly to step 23.

Steps 17, 18, 19 and 20 illustrate optional additional steps that may be performed by the controller 62 of the control system such as to gain additional information from the video images captured. For example, in step 17 the controller 62 performs a pattern recognition analysis on the video images received such as to recognize the user 44 from the images. By step 17, the control system 60 will be able to recognize which user provides which input, or alternatively whether the input is received from a known user or from an unknown person present on the video images. This information may for example be used to personalize the system for each user and enable the use of user profiles wherein gestures zone definition data is present for personalized gesture zones. For example, user 44 may have his gesture zones defined as is indicated in FIGS. 2a and 2b, however a different user may have gesture zones defined at different locations which are more convenient to him/her. Also, by enabling detection of whether input is received from a known user or an unknown person, the system may act differently dependent on this information. For example, the system may be programmed to ignore the input from an unknown person, as to only accept input from known users. Alternatively, the system could be programmed to allow an unknown person to control only a limited number of device functions of all the device functions that are available to known users.

In step 18 the controller determines the distance between two users or further persons in the image. Alternatively, the system may determine the distance between the user and for example an object in the image. This may for example be used to make the location, the shape or the presence or absence of one of more of the gesture zones that is monitored by the controller dependent on the distance. For example, certain gesture zones such as gesture zone 56 in FIGS. 2a and 2b may only be monitored when user 44 is within a certain distance from the television 35.

In step 19, the controller 62 may perform a pattern recognition analysis of the one or more video images received from the video capture equipment camera devices 68 and 69 for recognizing an ongoing activity in the space 30 which is monitored. For example, in step 19 the controller 62 may detect the user 44 to walk over to the table 33, and in response activate gesture zone 55 above the table 33 for monitoring. Another possibility is that the controller 62 in step 19 detects whether users or other persons are sitting on a couch or other seat near table 33, and activate gesture zone 55 in response thereto. It will be appreciated detection of other ongoing activities and a desired response thereto can also be implemented through step 19.

In step 20, the controller 62, establishes depth information from the video images received from camera devices 68 and 69. This may be done in various ways. Depth information mails who be retrieved from video images captured using a single video capture equipment camera device. This will be explained with reference to FIGS. 4 and 5 below.

In FIG. 1, the steps 17, 18, 19 and 20 are schematically illustrated to be performed simultaneously (parallel to each other). As will be appreciated, the steps 17, 18, 19 and 20, each of which is completely optional to the invention, may also be performed consecutively in any desired order. The invention is not limited to the specific ordering and timing of these steps illustrated in FIG. 1.

Figure 4:
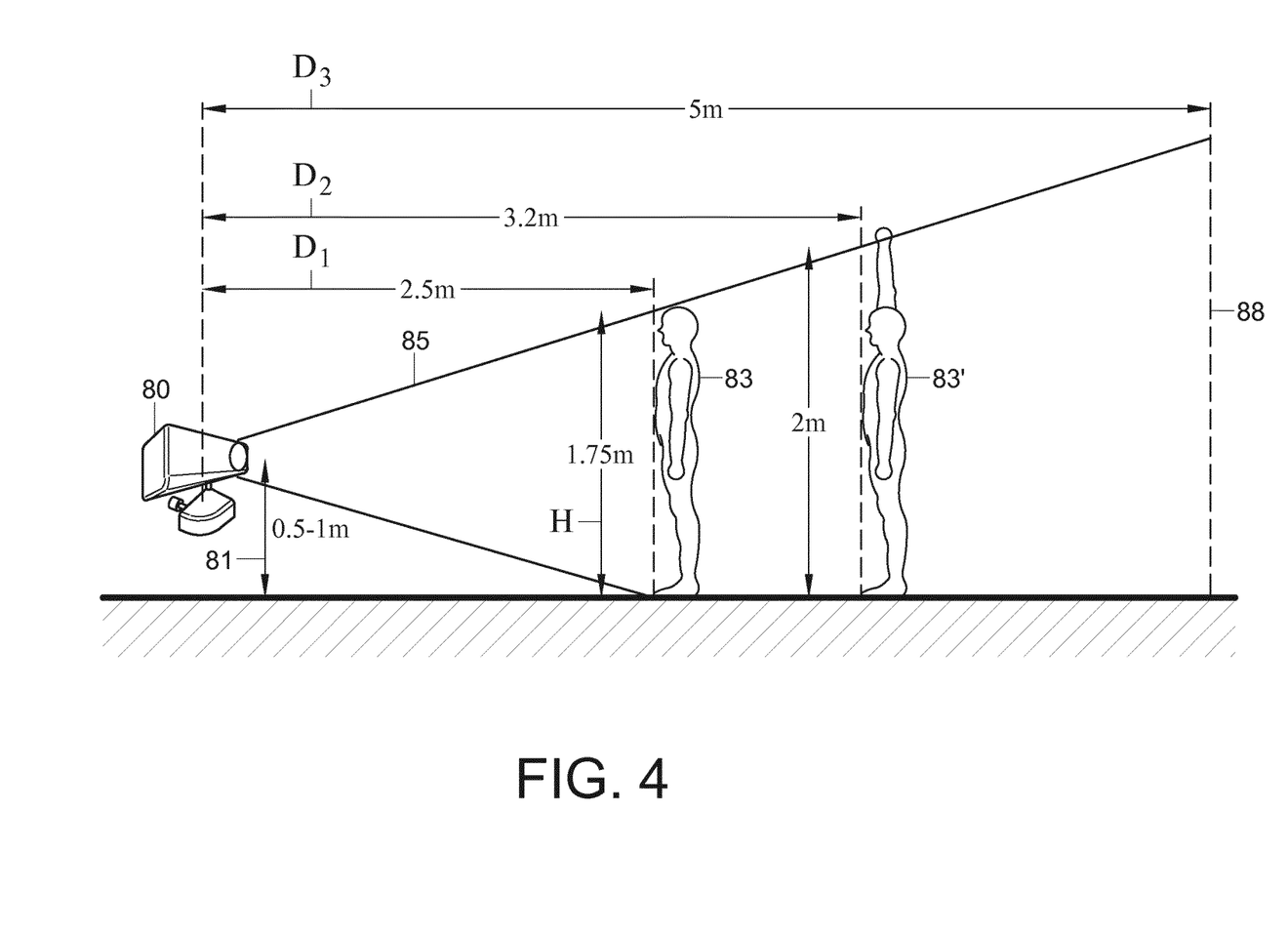
FIG. 4 schematically illustrates a field of a view of a motion capture equipment camera device used in the control system of the present invention.

FIG. 4 schematically illustrates how a video capture equipment camera device may retrieve depth information from the image captured if there is only one camera device 80. The camera device 80 monitors a person 83. In the position indicated in FIG. 4, person 83 completely fills the image from top to bottom captured by the camera device 80. The height of the person 83 is indicated by H. Person 83 is standing at a distance D1 from the camera device 80. The field of view of the camera 80 is indicated by 85. Camera 80 is positioned at a height 81 above the ground. Person 83' is the same person as 83, only then located more to the back at distance D2 to the camera 80. In the location indicated by person 83', the height H of the person from feet to head will fill a smaller amount of the image, and the person therefore becomes smaller on the image captured by camera device 80. By knowing the height H, or by comparing the height relatively as the person moves to the image, from the image captured by camera device 80 depth information can be retrieved by the control system. The distances of person 83 in the first position, 83' in the second position and the back wall 88, are indicated respectively by D1, D2 and D3.

Figure 5:
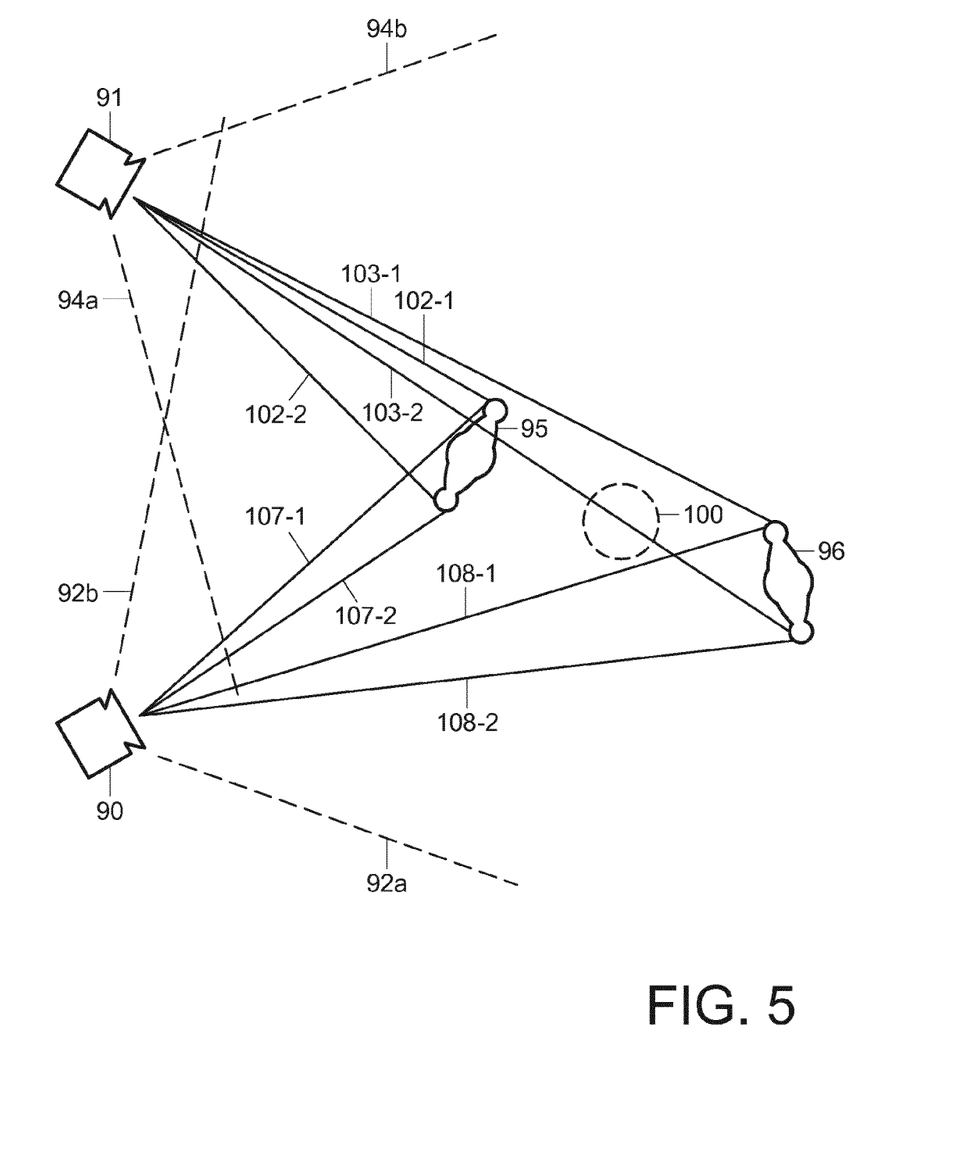
FIG. 5 schematically illustrates how camera devices in motion capture equipment in a control system of the present invention cooperate to provide depth information.

FIG. 5 illustrates schematically how depth information from the image can be acquired if use is made of two camera devices 90 and 91 forming the video capture equipment. The field of view of camera device 90 is schematically indicated by dotted lines 92a en 92b. The field of view of camera device 91 is schematically indicated by dotted lines 94a and 94b. Two persons 95 and 96 (schematically illustrated) are standing in the field of view of both cameras 90 and 91. The edges of person 95 on the image of camera 90 is schematically illustrated by the lines 107-1 and 107-2. For person 96 on camera 90, this is indicated by lines 108-1 and 108-2. In the image of camera 91, lines 102-1 and 102-2 indicate the contours of person 95, and lines 103-1 and 103-2 indicate the contours of person 96. In between person 95 and 96, a gesture zone 100 is present to be monitored.

Clearly in the image of camera 91, it is difficult, and maybe even impossible, to distinguish person 95 from person 96. This is because person 96 stands largely behind person 95 in the image. Moreover, if person 96 reaches out to gesture zone 100, this will not be detected by camera 91 since gesture zone 100 is located behind person 95 and therefore not visible. In the image of camera 90, both persons 95 and 96 and the gesture zone 100 are completely visible. Therefore, a gesture performed by person 96 by reaching out to gesture zone 100 can be detected from the video images captured by camera 90. From the video images captured by cameras 90 and 91, depth information can be retrieved which allows to distinguish different persons 95 and 96, monitored the gesture zone 100 at all times, and even derive distance information between options (e.g. the distance between persons 95 and 96.)

The method and system of the present invention provide various advantages over the prior art gesture based control systems and methods. For example, the system of the present invention allows for the control of many device functions without basically requiring advance analysis algorithms to perform pattern recognition in the images. Simply the detection of a body part (e.g. hand) in a gesture zone is sufficient to identify the device function to be controlled, and for device function that are controlled by a Boolean parameter (either on or of, 0 or 1, left or right, etc.) the mere detection of the presence of the body part in the gesture zone is sufficient to provide full control over the function. Moreover, by only requiring to monitor the gesture zones, a lot of arithmetic capability is saved for other tasks or for reducing energy consumption, since it is not necessary to monitor a complete image for the detection of gesture zones. In a more advanced setting, it may also be possible to monitor only the gesture zones or even a small area thereof, and enlarge the area of monitoring once an activity is detected in the smaller area. This for example allows to perform simple detection of activity first, and to add advanced analysis after activity has been detected. Such more advanced analysis could then include recognition of motion patterns, or any of the steps 17-20 described above in relation to FIG. 1. Moreover, these steps 17-20 could be part of the standard process implemented for operating the control system as already mentioned above.

The present invention has been described in terms of specific embodiments thereof. It will be appreciated that the embodiments shown in the drawings and described here and above are intended for illustrative purposes only, and are not by any manner or means intended to be restrictive on the invention. The context of the invention discussed here is merely restricted by the scope of the appended claims.

The invention claimed is:

1. A method of operating a control system for controlling a device, the control system comprising a motion capture equipment, and a controller for providing control signals for controlling one or more device functions of the device, the method comprising the steps of:
   capturing, by the motion capture equipment, motion picture images of a space and providing the motion picture images to the controller;
   performing a pattern recognition analysis on one or more of the motion picture images for distinguishing input from known and unknown users,
   analyzing, by the controller, the motion picture images for detecting user input from a user in the space, comprising:
      monitoring one or more gesture zones in said motion picture images, each gesture zone being associated with one respective device function of said one or more device functions,
      determining the gesture zone wherein the gesture is detected for establishing the selected device function to control,
   detecting by the controller a gesture performed by the user; and
   providing, by the controller in response to said detecting of the gesture, a control signal to the device for controlling a selected device function of said one or more device functions.

2. The method according to claim 1, wherein at least one of the gesture zones monitored is anchored to an entity present in the space and visible in at least one of the motion picture images, the entity being at least one of an object or a spatial feature, the spatial feature being a feature of the surroundings defining the space.

3. The method according to claim 1, wherein at least one of the gesture zones monitored is anchored to an entity present in the space and visible in at least one of the motion picture images, the entity being at least one of the user or a further person.

4. The method according to claim 3, wherein a plurality of gesture zones are anchored to the user, such that each of said anchored gesture zones is located in a different position relative to the user, and wherein the anchored gesture zones are unconnected and non-overlapping.

5. The method according to claim 1, wherein gesture zone definitions data of the gesture zones monitored is obtained by the controller by at least one of: accessing a data repository containing said gesture zone definitions data, or receiving gesture zone definition data through a wireless or wireline network.

6. The method according to claim 1, further comprising, upon recognizing the user, the controller accessing a gesture zone profile associated with said recognized user, said gesture zone profile containing gesture zone definition data customized for the recognized user, wherein said gesture zone profile is used by said controller for performing said analyzing of the motion picture images for detecting user input by said recognized user.

7. The method according to claim 1, wherein at least one of the location, the shape, or the presence or absence of one or more of the gesture zones monitored by the controller is dependent on the presence or absence of one or more users and/or further persons recognized by said controller, the controller using different gesture zone definition data dependent on said recognition.

8. The method according to claim 1, further comprising a step of determining a distance between two users and/or further persons, wherein at least one of the location, the shape, or the presence or absence of one or more of the gesture zones monitored by the controller is dependent on said distance.

9. The method according to claim 1, further comprising a step of the controller performing a pattern recognition analysis on one or more of the motion. picture images for recognizing of an ongoing activity in said space,
   wherein at least one of the location, the shape, or the presence or absence of one or more of the gesture zones monitored by the controller is dependent on said recognition of the activity, wherein the controller uses different gesture zone definition data dependent on said recognition of the activity.

10. The method according to claim 1, further comprising establishing depth information from said motion picture images, the method comprising at least one of:
   said step of analyzing being performed by analyzing motion picture images captured using two or more camera units for obtaining depth information from said motion picture images;
   said step of analyzing comprising a step of size analysis of objects and/or users and/or further persons in said motion picture images such as to establish said depth information.

11. A control system for controlling a device, the control system comprising:
   a motion capture equipment,
   a computer-readable memory that is not a transitory propagating wave or signal, and comprising instructions stored thereon,
   a controller for providing control signals for controlling one or more device functions of the device in accordance with the stored instructions to perform acts comprising:
       capturing, by motion capture equipment, motion picture images of a space and providing the motion picture images to the processor;
       performing a pattern recognition analysis on one or more of the motion picture images for distinguishing input from known and unknown users,
       analyzing, by the processor, the motion picture images for detecting user input from a user in the space, comprising:
           monitoring one or more gesture zones in said motion picture images, each gesture zone being associated with one respective device function of said one or more device functions,
           determining the gesture zone wherein the gesture is detected for establishing the selected device function to control,
       detecting by the controller a gesture performed by the user; and
       providing, by the controller in response to said detecting of the gesture, a control signal to the device for controlling a selected device function of said one or more device functions.

12. The control system according to claim 11, further comprising at least one of:
   a data repository for storing therein gesture zone definitions data of the gesture zones monitored by the controller; and
   a wireless or wireline communications unit for receiving gesture zone definitions data of the gesture zones monitored by the controller.

13. The control system according to claim 11, wherein the motion capture equipment includes one or more camera units, and wherein the controller is arranged for establishing depth information from motion picture images received by the one or more camera units.

14. A computer-readable storage medium that is not a transitory propagating wave or signal, and on which is stored a computer program comprising code instructions for execution of a method when executed by a processor for providing control signals for controlling one or more device functions of a device, the instructions comprising:
   capturing, by motion capture equipment, motion picture images of a space and providing the motion picture images to the processor;
   performing a pattern recognition analysis on one or more of the motion picture images for distinguishing input from known and unknown users,
   analyzing, by the processor, the motion picture images for detecting user Input from a user in the space, comprising:
       monitoring one or more gesture zones in said motion picture images, each gesture zone being associated with one respective device function of said one or more device functions,
       determining the gesture zone wherein the gesture is detected for establishing the selected device function to control,
   detecting by the controller a gesture performed by the user; and
   providing, by the controller in response to said detecting of the gesture, a control signal to the device for controlling a selected device function of said one or more device functions.

* * * * *